J. L. GLEASON.
SIGNALING DEVICE.
APPLICATION FILED NOV. 22, 1915.

1,251,998.

Patented Jan. 1, 1918.

Inventor:
John L. Gleason,
By his attorney, Gailed N. Gooding.

UNITED STATES PATENT OFFICE.

JOHN L. GLEASON, OF JAMAICA PLAIN, MASSACHUSETTS.

SIGNALING DEVICE.

1,251,998.   Specification of Letters Patent.   Patented Jan. 1, 1918.

Application filed November 22, 1915. Serial No. 62,839.

*To all whom it may concern:*

Be it known that I, JOHN L. GLEASON, a citizen of the United States, residing at Jamaica Plain, in the county of Suffolk and State of Massachusetts, have invented new and useful Improvements in Signaling Devices, of which the following is a specification.

This invention relates to signaling devices and is designed more particularly for use at night on motor vehicles to indicate to operators of following vehicles in which direction a turn is to be made and to supplement the usual method of projecting an arm to one side or the other of the vehicle to indicate the direction in which the vehicle is to be turned.

The object of the invention is to provide a set of indicators arranged at the rear of the vehicle in suitable relation to the usual rear light and normally obscured, said indicators being operatively connected with the front of the vehicle whereby the operator thereof may expose one or the other of said indicators to indicate a left or right turn of said vehicle.

The invention consists in the combination and arrangement of parts set forth in the following specification and particularly pointed out in the claims.

Referring to the drawings.

Like numerals refer to like parts throughout the several views of the drawings.

Figure 1:
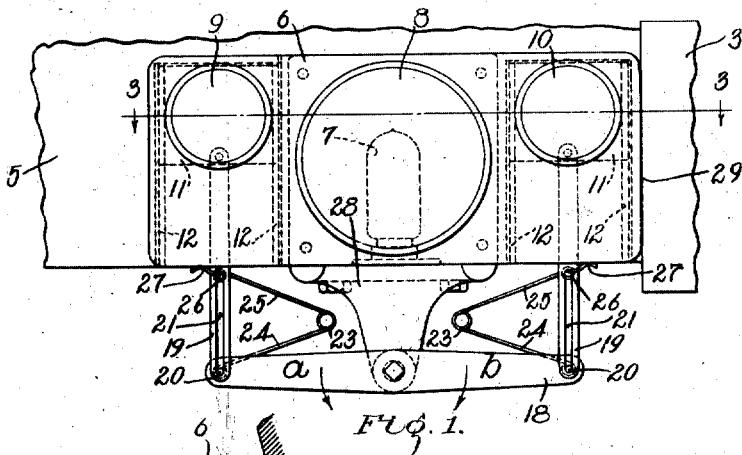
Figure 1 is an elevation of a signaling device embodying my invention, the same being viewed from the rear of the vehicle to which said device is attached, the portion only of said vehicle to which said device is attached being shown in the drawings.
Figure 2:
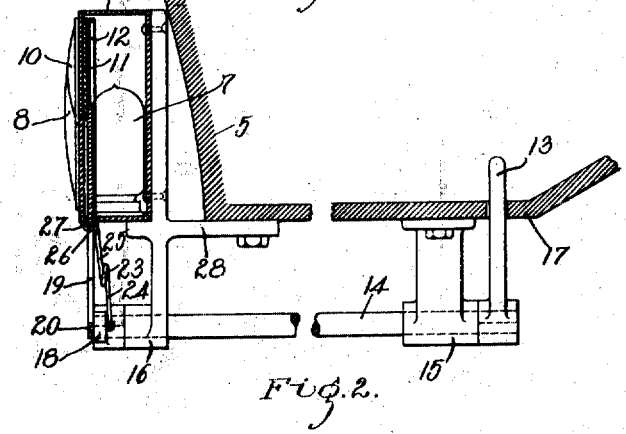
Fig. 2 is a part side elevation and part section of the device illustrated in Fig. 1 with the same attached to a vehicle, which is shown only in part.
Figure 3:
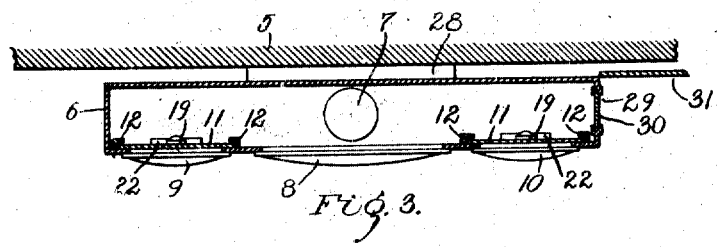
Fig. 3 is a section taken on line 3—3 of Fig. 1.

In the drawings, 5 is the body of a vehicle and 6 a casing within which is arranged suitable illuminating instrumentalities, indicated in the present case by a bulb 7, although if desired, any other type of lamp may be employed.

It is compulsory that all motor vehicles carry a rear lamp which shall shine through a red light of glass. Furthermore the number plate of the vehicle at the rear thereof must also be illuminated at night and it is the usual custom to provide a single lamp which serves for both purposes. It is the purpose of this invention to utilize the aforesaid illuminating instrumentalities in accomplishing the desired result.

The casing 6 is therefore provided with a light of glass 8, preferably centrally disposed relatively to said casing and composed of red glass or other transparent material with the bulb 7 arranged substantially in alinement therewith. A pair of lights 9 and 10, preferably somewhat smaller than the light 8 and disposed at opposite sides of said light 8, serve to permit the rays of light from the illuminating instrumentalities within the casing 5 to issue or be projected from said casing.

The lights 9 and 10 are preferably formed of glass or other suitable transparent material and of a different color from the light 8, preferably blue. The rays of light from the illuminating instrumentalities within the casing 6 are normally prevented from shining through the lights 9 and 10, but when it is desired to turn either to the left or to the right, the light corresponding to said turn is illuminated or made visible, while the opposite side remains dark.

For this purpose shutters 11 have been provided to slide across the openings for the lights 9 and 10, said shutters being preferably arranged to slide in guides 12 formed upon the interior of the wall of the casing containing the openings for said lights. The shutters 11 are preferably operatively connected by means extending to the forward end of the vehicle and arranged adjacent the operator's seat, whereby said operator may, either by hand or foot, manipulate said shutters to expose one or the other of said lights.

As a convenient means for accomplishing this result I have provided a lever 13 secured to a shaft 14 extending from the front to the rear of the vehicle and journaled in bearings 15 and 16. The lever 13 projects upwardly from the shaft 14 through the floor 17 and in a convenient position for the operator to manipulate the same.

At the rear end of the shaft 14 is a rocker arm 18 which is secured thereto substantially midway between its ends. To each of the ends of said rocker arm 18 a link 19 is attached preferably by means of a screw 20, said screws having slidable engagement with said links in slots 21. The upper ends of the links 19 are secured to the shutters 11 projecting thereto through slots or openings 22 in the lower wall of the casing 6.

The lights 9 and 10 are preferably arranged adjacent the upper portion of the casing 6, thus when the shutters are moved to expose said lights, or permit the rays of light to pass therethrough, said shutters will be moved downwardly. The normal positions of the shutters 11 are at the upper portions of the casing and across the openings for the lights 9 and 10, in which positions said shutters are maintained, preferably by means of U-shaped springs 23.

The lower arm 24 of the spring 23 encircles the screw 20, while the upper arm 25 thereof is offset at 26 and projects through the slot 21 engaging the link 19 at the upper end of said slot, thereby yieldingly retaining the screw 20 at the lower end of said slot and at the same time maintaining the shutters at their uppermost positions, as one of said springs counteracts the action of the opposite spring. The end of the arm 25 is furthermore extended at 27 and engages the lower wall of the casing 6 for the purpose of insuring the rocker arm 18 remaining in its horizontal position, as illustrated in Fig. 1.

For convenience, the casing 6 is secured to a bracket 28 carrying the journal 16 for the shaft 14, while said bracket is in turn secured to the frame 5 of the motor vehicle. Another opening, preferably at the end 29 of the casing 6, is provided within which a transparent sheet of material 30 is provided for permitting rays of light from the bulb 7 to shine upon a number plate 31, which is preferably arranged adjacent the end of said casing.

To operate the device, the operator of the vehicle rocks the lever 13 either to the right or to the left according to the direction in which he is to turn, which movement rocks the rocker arm 18. Should said lever 13 be rocked toward the left, the arm 18 would be rocked in the direction of the arrow "a," see Fig. 1, causing the shutter 11 to be lowered and permitting the rays of light from the interior of the casing to shine through the light 9. When the left hand end of the arm 18 is depressed, as just referred to, the right hand end is moved upwardly permitting the screw 20 to slide upwardly in the slot 21 without moving the shutter for the light 10, although the spring 23 will be compressed. Upon the releasing of the lever 13 said spring 23 immediately expands to return the rocker arm 18 to its normal position, thus closing the opening for the light 9.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific application herein shown, but that extensive deviations from the illustrated form or embodiment of the invention may be made without departing from the principles thereof.

Having thus described my invention what I claim and desire by Letters Patent to secure is:

1. A signaling device for vehicles having, in combination, a casing, a pair of lights for said casing, illuminating means adapted to project illuminating rays through said lights, a plurality of shutters, one for each of said lights adapted to normally obscure said illuminating rays, a rocker arm, a plurality of links, one pivotally attached to each of said shutters and slidably engaging one of the ends of said rocker arm, an operating lever adapted to be moved to rock said rocker arm to withdraw one or the other of said shutters, and a plurality of springs, one interposed between each end of said rocker arm and the link attached thereto.

2. A signaling device for vehicles having, in combination, a plurality of shutters, a plurality of links, one pivotally attached to each of said shutters, said links each having a slot extending longitudinally thereof, an actuating member, pins on said actuating member adapted to enter the slots in said links, and springs adapted to yieldingly maintain said pins at one end of said slots, whereby when said actuating member is operated in either direction one of said shutters will be positively moved to disclose said illuminating rays, the other shutter remaining closed.

3. A signaling device for vehicles having, in combination, a plurality of shutters, a plurality of links, one pivotally attached to each of said shutters, said links each having a slot extending longitudinally thereof, an actuating member, pins on said actuating member adapted to enter the slots in said links, and a plurality of V-shaped springs, one interposed between each of the pins on said actuating member and the opposite end of the slot within which said pin is arranged, whereby when said actuating members operate said slide will be positively moved in one direction and yieldingly moved in the opposite direction for a portion of the movement of said actuating member.

In testimony whereof I have hereunto set my hand in presence of two subscribing witnesses.

JOHN L. GLEASON.

Witnesses:
CHARLES S. GOODING,
SYDNEY E. TAFT.